Patented May 11, 1948

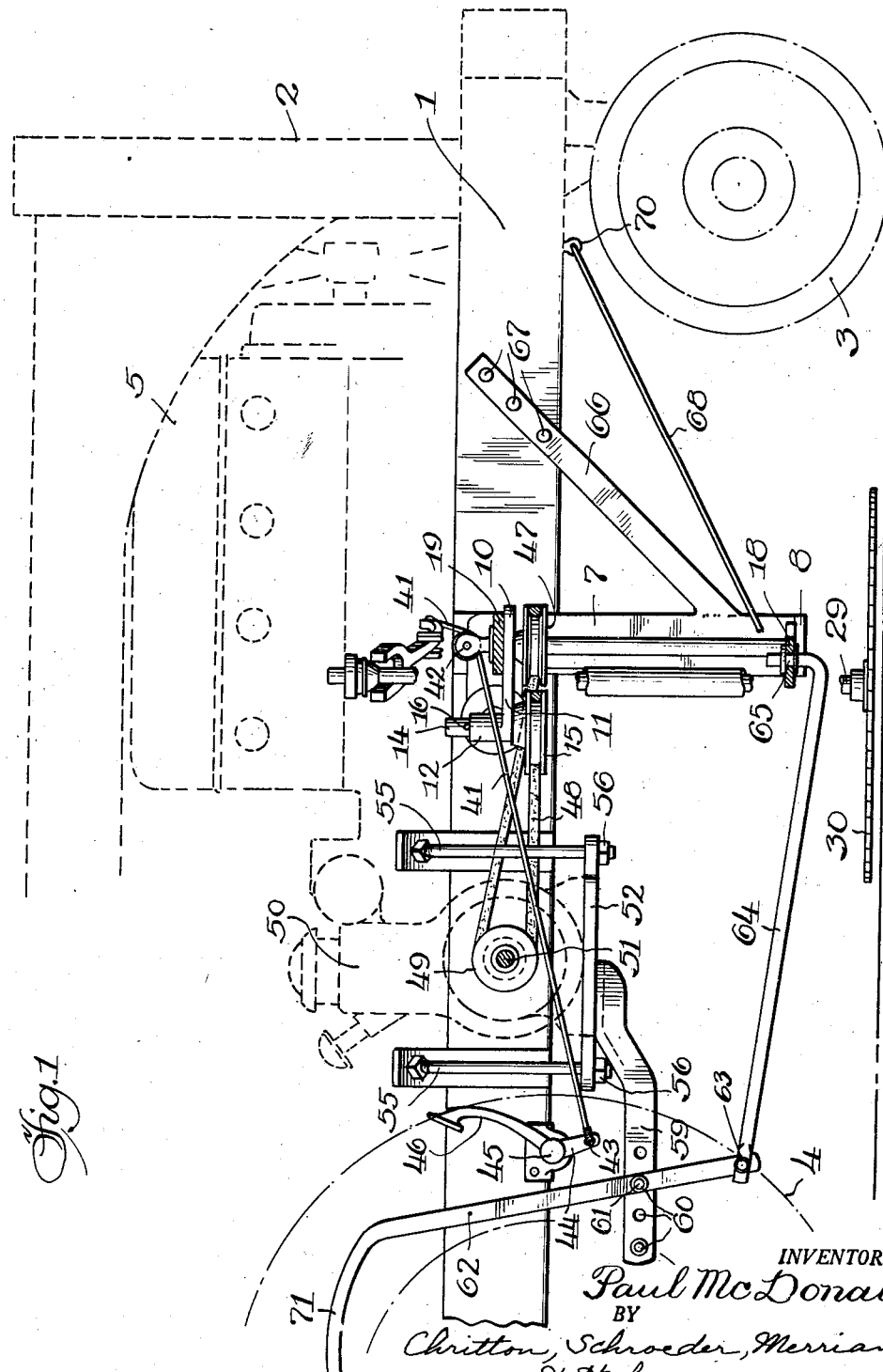

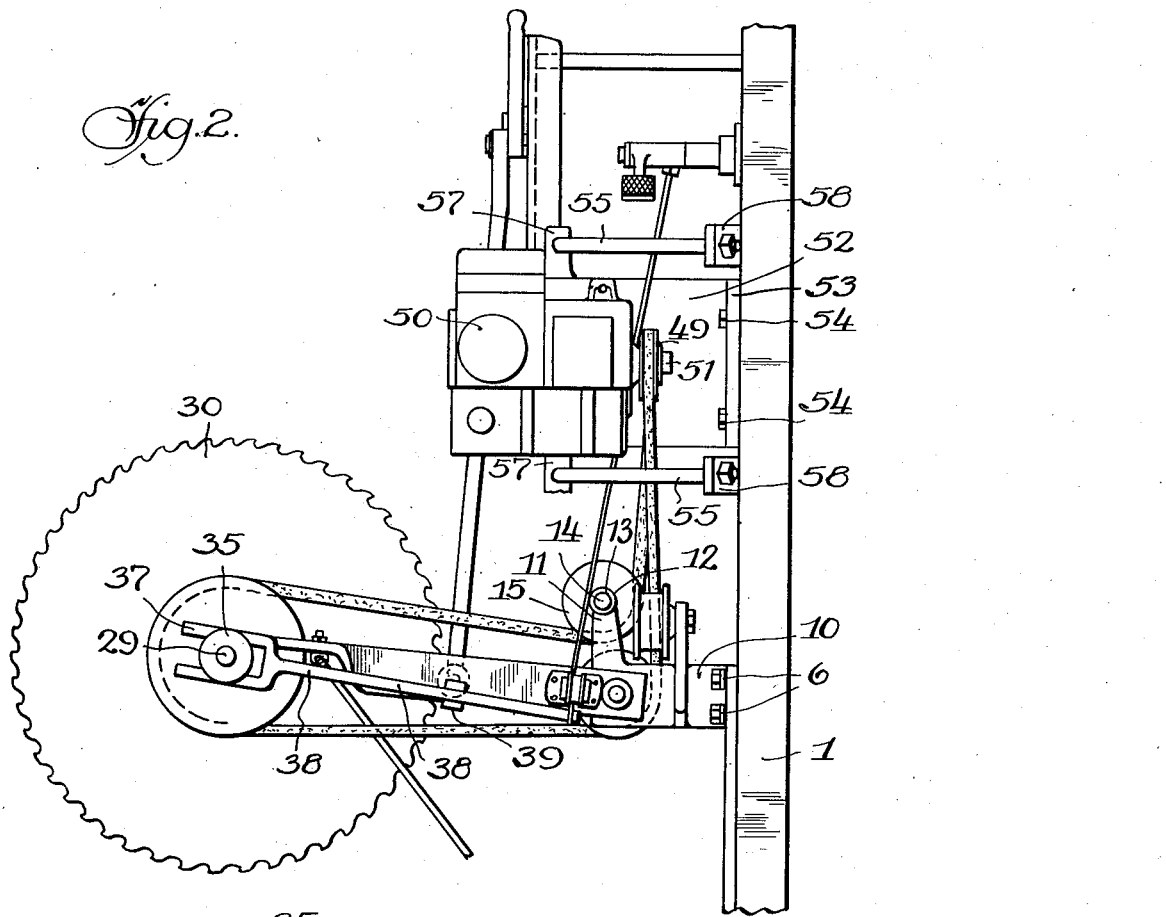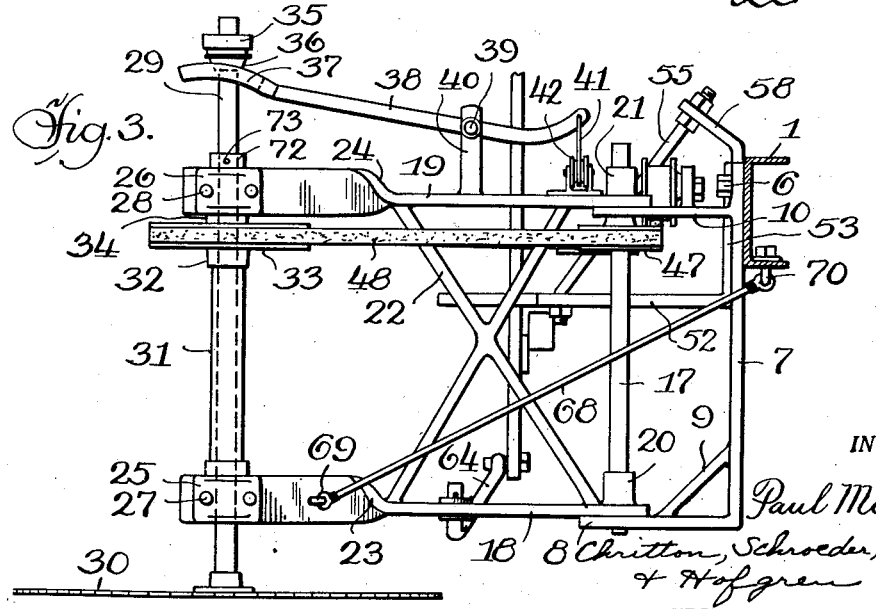

2,441,431

UNITED STATES PATENT OFFICE 2,441,431

PORTABLE POWER SAW HAVING A HORIZONTAL CIRCULAR SAW SWINGABLE IN A HORIZONTAL PLANE AND MOVABLE VERTICALLY

Paul McDonald, Danville, Iowa, assignor of one-half to Austin R. McDonald, New London, Iowa Application May 31, 1946, Serial No. 673,320

1 Claim. (Cl. 143—43)

This invention relates to a portable power saw and more particularly to a power saw attachment for a power vehicle such as a tractor and the like, for cutting brush, trees, and the like.

As is well known, it is a difficult and laborious task to cut brush from farm land and the like, especially when such brush has acquired substantial thickness. In the present invention I have provided a circular power saw attachment capable of being mounted on the frame of a tractor or the like, the circular saw being vertically adjustable so that it may be lowered close to the ground, and as the tractor is moved along the ground the saw will cut the brush by moving in a straight path through the underbrush. Also the present invention includes means for swinging the arms upon which the saw is carried, in a horizontal path, for felling trees or other objects when desired. I have also so located the means for vertically adjusting the saw, and the means for swinging the saw in a horizontal plane, adjacent the driver's seat on the tractor, so that these adjustments and swinging movement may be easily effected while the operator is on the driver's seat.

Among the objects of my invention are: to provide a novel and improved portable power saw attachment; to provide an attachment of the type referred to that may be readily attached to and detached from a tractor when desired; to provide a power saw attachment for tractors and the like, having a novel means for vertically adjusting the saw with relation to the ground; to provide an attachment of the type referred to having a novel means for swinging the rotating saw in a horizontal plane; to provide a power saw attachment for tractors and the like, capable of cutting brush, felling trees, and the like; to provide means for limiting the amount of rearward swinging movement of the saw; and such further objects, advantages and capabilities, inherently possessed by my invention, as will later more fully appear.

My invention further resides in the combination, construction and arrangement of parts illustrated in the accompanying drawings, and while I have shown therein for illustrative purposes a preferred embodiment, I wish it understood that the same is susceptible of modification and change without departing from the spirit of my invention.

In the drawings:

Fig. 1 is a side elevation, partly in section, showing my power saw attachment attached to the side of a tractor, the tractor being only partially shown diagrammatically.

Fig. 2 is a top plan view of my power saw attachment, showing fragmentarily a portion of the tractor frame.

Fig. 3 is a fragmentary front elevation of my power saw attachment, looking toward the front (the bottom as viewed in Fig. 2) but omitting the engine for driving the saw.

In the form shown in the drawings my device is attached to one of the side members 1 of a tractor designated generally by 2 having front wheels 3, rear driving wheels 4, and the usual engine 5 for driving the tractor. The tractor side frames 1 may be channel irons, wooden beams, or any other suitable frame construction that may be present in the tractor and to which the device is applied. Fixed by bolts 6, or other suitable fastening means, to the side of the side frame 1, and extending vertically downward therefrom, is a bracket 7 having at its bottom end an outwardly extending flange or plate 8, reenforced by a brace 9 connected at its end to the plate 8 and the bracket 7. Near the upper end of the bracket 7 is another outwardly extending flange or plate 10, parallel to plate 8. Plates 8 and 10 are preferably integrally connected to the bracket 7, although as will be understood, they may be otherwise firmly fixed thereto as desired. As seen in Fig. 2, the top plate 10 at its outer end has a rearwardly extending arm 11, provided at its rear end with an upstanding integral hub 12 having a vertical opening 13 to receive a stub shaft 14 upon the lower end of which is mounted a pulley 15.

The pulley 15 is preferably fixed to stub shaft 14, which latter may be rotatably held in position in the hub 12 by a pin 16 slidably resting upon the upper end of hub 12 when shaft 14 rotates under action of the pulley 15. Or if desired the pulley may be rotatably mounted in any suitable manner on the shaft 14.

Extending through suitable holes in the plates 8 and 10 of the bracket 7, is a vertical shaft 17 which at its upper end extends a distance above plate 10. Swingably mounted upon the shaft 17 are a pair of laterally extending arms 18 and 19. The lower arm 18 is preferably formed with an integral hub 20 having an opening through which shaft 17 passes, it being seen in Fig. 3 that the lower inner face of arm 18 rotatably bears upon the adjacent surface of plate 8. The top arm 19 is likewise formed with a similar upstanding hub 21 surrounding shaft 17, the lower inner face of arm 19 rotatably resting upon upper plate 10.

The lower and upper arms 18 and 19 are rigidly braced together to form a unitary structure by means of the integral or otherwise fixed cross braces 22. At an intermediate portion thereof each of the lower and upper arms 18 and 19 are formed with a 90° bend 23 and 24, as a result of which the right hand portion (as viewed in Fig. 3) of each of these arms is positioned in a horizontal plane whereas the left hand or outer end of each thereof is positioned in a vertical plane. This accommodates a pair of bearing caps 25 and 26, which are attached by bolts 27 and 28 to the outer ends of the arms to complete a pair of bearings which rotatably receive the vertical saw shaft 29 having fixed at its bottom end a circular saw 30. Fixed to the upper side of the outer end of bottom arm 18 to extend upwardly therefrom, is a tube or sleeve 31 having fixed at its top an enlarged head 32 to rotatably support the pulley 33 splined to rotate with shaft 29 but yet permitting vertical movement of shaft 29 through the pulley 33, tube 31 and bearing members 25 and 26. Pulley 33 is rotatably mounted between head 32 of tube 31 and the hub 34 extending a slight distance downwardly from the bearing of the upper arm 19.

Fixed to the upper end of shaft 29 is a collar 35 formed on its lower side with an annularly curved portion 36 of approximately spherical shape to rotatably contact with the forked end 37 of the outer end of the adjusting lever 38. This lever is fulcrumed at 39 on the pedestal 40 fixed to the upper arm 19. The rear end (right hand end as viewed in Fig. 3) of lever 38 has pivotally mounted thereto a flexible member 41 which may be in the form of a chain, cord, or the like. This flexible member 41 passes downwardly under and through the groove of a sheave pulley 42 and then to the rear where it is pivotally connected at 43 to the bottom end of an arm 44 fixed below the fulcrum 45 to foot pedal 46 adjacent the driver's seat on the tractor (see Fig. 1). Movement of this foot pedal in a clockwise direction as viewed in Fig. 1 will pull rearwardly upon the flexible member 41, moving the rear end of lever 38 downwardly and the outer end thereof upwardly. By suitably manipulating the foot pedal 46 the saw 30 and shaft 29 will thus be moved in a vertical direction to any desired extent without preventing rotation of this shaft and saw. This enables the saw to be adjusted vertically with relation to the ground to give a cutting action at a desired height above the ground. Any suitable means may be provided as desired for holding the shaft and saw in various vertically adjusted positions.

Mounted upon the shaft 17, to rotate thereon or therewith as desired, is a pulley 47. It is thus seen that pulleys 15 and 47 are mounted beneath the upper plate 10 closely adjacent each other, but separated a sufficient distance to enable the belt 48 to pass thereover. This belt also passes over the pulley 33, splined on the saw shaft 29. From pulleys 15 and 47 belt 48 extends rearwardly and passes over pulley 49 of the auxiliary engine 50. It is thus seen that rotation of pulley 49 on the auxiliary engine 50 drives the belt 48 over pulleys 15, 47, 33, and 49 to effect rotation at the desired speed of the saw shaft 29 and saw 30. While I have shown and described an auxiliary engine 50 for the sake of giving greater flexibility to the operation of my device, it will be understood that pulley 49 may be mounted in any desired operative manner to receive its driving rotation from the main engine 5 of the tractor, without departing from the spirit of my invention. The drive pulley 49 is mounted upon the inner end of the drive shaft 51 of the auxiliary engine, as viewed in Fig. 1, but this engine has been shown therein in dotted lines and the pulley 49 in solid lines for the sake of clearness. The relation of these parts will be understood from an inspection of Fig. 2.

The auxiliary engine 50 is mounted upon a supporting platform 52 connected by a flange, bracket or the like 53 to the side frame 1 of the tractor by bolts 54. To provide sufficient bracing action or reenforcement for the platform 52 which carries the weight of the auxiliary engine, I have provided diagonally extending brace rods 55 which at their lower ends are secured by nuts 56 to ears 57 extending outwardly from the opposite ends of this platform. These brace rods 55 at their upper ends are each secured by appropriate nuts or the like to the angular end 58 of a metal bar secured to the side face of the side frame 1. The engine has been omitted in Fig. 3 for the sake of clearness, but the engine supporting platform and brace rods are shown therein.

Fixed to the bottom face of the engine supporting platform 52 is a rearwardly extending bracket member 59 formed at its rear end portion with a plurality of openings 60 to selectively receive the fulcrum pin 61 of the lever 62 which at its upper end is curved rearwardly at an approximately horizontal position adjacent the driver's seat of the tractor. The lower end of lever 62 is fulcrumed at 63 to the rear end of the rigid metal connecting rod 64 which in turn is pivotally connected at 65 to an intermediate position of the lower arm 18.

As seen in Fig. 1, the vertically extending bracket 7 is further braced in position on the side frame 1 of the tractor by an angle-iron 66 secured by bolts or other suitable fastening means passing through the holes 67. In order to prevent the saw-frame from swinging too far to the rear during its brush cutting operation, I have provided a cable, rope, or other flexible member 68 which at its lower end is fixed by eyelets or other fastening means at 69, to the outer portion of the lower arm 18. At its upper forward end it is fixed by similar eyelets or the like 70 to the lower flange of the side frame of the tractor. This cable 68, being flexible will permit the saw-frame to be swung forwardly as when felling a tree or the like, but will limit the amount of rearward swinging movement thereof, which is desirable when using the saw for cutting underbrush.

From the above it will be understood that when the auxiliary engine 51, or other suitable power means, is in operation, the rotation of pulley 49, through belt 48 passing over the several pulleys will, through saw shaft 29, drive the circular saw 30 in a cutting direction. When cutting brush the cable 68 will hold the saw frame against rearward swinging movement, and the tractor may be moved over the plot on which the brush is being cut, so that the saw will cut a straight path through the underbrush as the tractor moves therealong. By moving the tractor over the plot, it will be understood that the underbrush may be cut on a considerable area in a remarkably short time. Should it be desired to cut the underbrush at a higher or lower level with relation to the ground all that is necessary is for the operator on the tractor seat to operate the foot pedal 46, which will move the cable, chain, or the like, 41, thus moving the inner end of lever 38 upwardly or downwardly and swinging the outer end thereof to adjust the saw shaft and saw vertically as desired.

Downward movement of the saw shaft and saw will be effected by gravity. Any suitable means (not shown) may be used for holding the parts stationary at any selected vertical position. The saw will be held at a predetermined distance from the ground by reason of the collar 72 fixed by pin 73 to the saw shaft 29, which collar will move upwardly away from the upper surface of the bearing of the upper arm 19 when the foot pedal 46 is operated to elevate the saw to a higher level.

As stated, the cable 68 will hold the saw frame stationary in a horizontal direction while cutting underbrush. Should it be desired to swing the saw frame and saw forwardly in a horizontal direction, for cutting a tree, or other stationary upstanding object, this may be done by moving the tractor to the desired adjacent location to bring the saw into proper position with relation to the tree or the like, after which the operator on the tractor seat may press with his arm downwardly upon the substantially horizontal upper end 71 of the lever 62, which will force the rigid connecting rod 64 forwardly, thus swinging the saw forwardly in a horizontal plane. It is thus seen that I have provided a portable power circular saw which may be held against rearward swinging movement when cutting brush, and in which the saw may be adjusted to any desired vertical position, and also may be swung forwardly in a horizontal plane when desired. The belt 48 is preferably a V-belt and the pulleys over which the belt runs will have complemental V-shaped grooves therein. Other shapes of belts and pulleys may, however, be used if desired. As stated above, the saw may be driven from an auxiliary engine or from the tractor engine, if desired. Also the saw attachment of the present invention may be attached to other forms of vehicles having a suitable engine mounted thereon, instead of being attached to a tractor, if desired.

I claim:

A portable power saw for cutting brush, trees, and the like, comprising a vertically extending bracket adapted to be fixed to a movable vehicle such as a tractor and the like, said bracket having a pair of horizontally extending members fixed one near the top and one near the bottom of the bracket and projecting laterally therefrom, a pair of laterally spaced vertical shafts mounted in said horizontally extending members, a rotatable pulley on each of said shafts, a pair of swingable horizontally extending arms pivotally connected to said horizontally extending members to swing in horizontal planes, a vertical saw shaft rotatably mounted in the outer ends of said swingable arms and having a circular saw fixed to the bottom end thereof, a pulley on said saw shaft, a belt passing over said pulleys, power means for driving said belt to rotate said saw, means operable from the drivers' seat of the vehicle for raising and lowering the saw, said means for raising and lowering the saw comprising a lever swingable in a vertical plane having a slot encompassing the saw shaft, and said saw shaft having a head fixed thereto above said slot whereby when the slotted end of the lever is swung upwardly it will contact said head and move the saw shaft and saw upwardly.

PAUL McDONALD.

REFERENCES CITED

The following references are of record in the file of this patent:

UNITED STATES PATENTS

| Number | Name | Date |
| --- | --- | --- |
| 827,548 | Martin | July 31, 1906 |
| 1,067,076 | Tapp | July 8, 1913 |
| 1,111,331 | Tower | Sept. 22, 1914 |
| 1,126,312 | Strauss | Jan. 26, 1915 |
| 1,182,976 | Conner et al. | May 16, 1916 |
| 1,274,231 | Bairs | July 30, 1918 |
| 1,318,324 | Keon | Oct. 7, 1919 |
| 1,447,543 | Gessman | Mar. 6, 1923 |
| 1,656,311 | Anthony | Jan. 17, 1928 |
| 2,216,971 | Farmer | Oct. 8, 1940 |
| 2,341,035 | Grzelak | Feb. 8, 1944 |
| 2,411,625 | Jawues | Nov. 26, 1946 |

FOREIGN PATENTS

| Number | Country | Date |
| --- | --- | --- |
| 497,180 | France | Sept. 4, 1919 |